United States Patent
Primdahl

[19]

[11] Patent Number: 5,833,849
[45] Date of Patent: Nov. 10, 1998

[54] SPOUT MOUNTED WATER FILTER AND EXTENSION

[75] Inventor: Richard D. Primdahl, Hoffman Estates, Ill.

[73] Assignee: Everpure, Inc., Westmont, Ill.

[21] Appl. No.: 848,578

[22] Filed: Apr. 28, 1997

[51] Int. Cl.⁶ .................................................. B01D 27/00
[52] U.S. Cl. .......................... 210/232; 210/282; 210/435; 210/460; 285/8
[58] Field of Search .................................. 210/232, 282, 210/435, 460; 285/8

[56] References Cited

U.S. PATENT DOCUMENTS

| | | | |
|---|---|---|---|
| 1,994,454 | 3/1935 | Cross | 285/8 |
| 2,875,452 | 3/1959 | Portolano | 285/8 |
| 3,227,380 | 1/1966 | Pinkston | 285/8 |
| 3,386,439 | 6/1968 | Harper | 285/8 |
| 3,823,824 | 7/1974 | Close | 210/282 |
| 3,853,761 | 12/1974 | McClory | 210/100 |
| 4,242,201 | 12/1980 | Stephens et al. | 210/282 |
| 4,556,484 | 12/1985 | Hunter et al. | 210/90 |
| 4,686,037 | 8/1987 | Lang | 210/221.2 |
| 4,744,895 | 5/1988 | Gales et al. | 210/416.1 |
| 4,753,728 | 6/1988 | VanderBilt et al. | 210/282 |
| 4,770,768 | 9/1988 | Lang | 210/94 |
| 4,814,078 | 3/1989 | Stern et al. | 210/282 |
| 4,980,056 | 12/1990 | Norton . | |
| 5,017,286 | 5/1991 | Heiligman | 210/266 |
| 5,116,502 | 5/1992 | Ferguson | 210/282 |
| 5,656,160 | 8/1997 | Parise et al. | 210/282 |

OTHER PUBLICATIONS

Advertisement for a "Toray" Mini 8 (two pages), Publication date unknown.

*Primary Examiner*—Jay H. Woo
*Assistant Examiner*—Betsey J. Morrison
*Attorney, Agent, or Firm*—Greer, Burns & Crain, Ltd.

[57] ABSTRACT

A spout-mounted water filter assembly suitable for use with a shallow sink having a short necked spout. The water filter assembly includes a water filter unit and an extension pipe which provides additional vertical clearance between the base of the sink and the outlet of the filter unit. The extension pipe may further be dimensioned to provide additional clearance relative to an inner edge of the sink in order to prevent interference between the water filter unit and the sink. The water filter assembly of the present invention is versatile and may be configured in a variety of orientations to fit a variety of sink/faucet combinations.

15 Claims, 4 Drawing Sheets

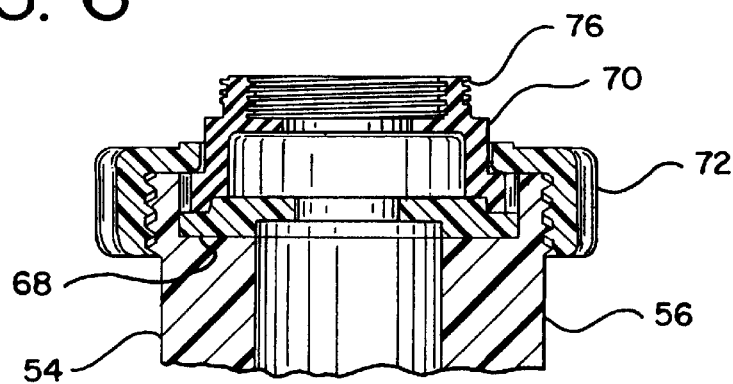
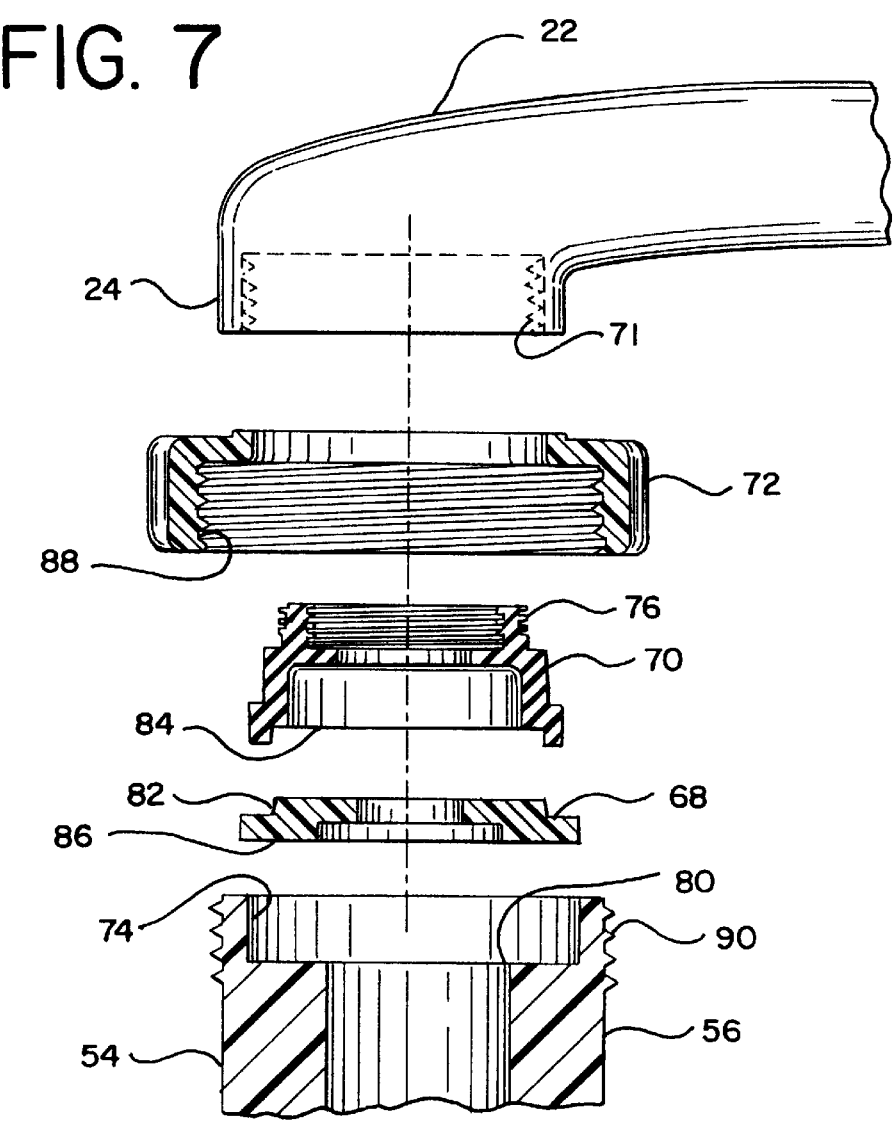

SPOUT MOUNTED WATER FILTER AND EXTENSION

FIELD OF THE INVENTION

The present invention relates generally to faucet mount water filters, and specifically to an extension for mounting a water filter to a spout of a water faucet to enable users to fill a variety of drinking containers at the faucet.

BACKGROUND OF THE INVENTION

A variety of spout-mounted water filters are known, such as those described in U.S. Pat. Nos. 5,017,286; 4,680,116; 4,686,037 and 4,770,768. By way of example, the '286 patent discloses a main filter housing containing a carbon block filter element which is attached to a spout using a threaded connector. The connector is provided with external threads which mesh with internal threads on a dispensing end of the spout. Filtered water is dispensed from an outlet on a bottom portion of the main filter housing. The water filter unit may additionally be provided with a diverter knob or lever for selectively dispensing filtered or unfiltered water.

The configuration of the '286 patent is typical of other such prior art units in that the outlet(s) for dispensing filtered/unfiltered water are located below the level of the faucet spout. This configuration reduces the clearance for positioning a cup or other conventional drinking container to receive the filtered/unfiltered water. Specifically, the prior art filter units are unsuitable for use in conjunction with a shallow sink such as a bathroom sink. In addition, such conventional filter units may provide inadequate clearance in a kitchen sink for dispensing water into a tall pot, vase or the like.

Conventional spout-mounted water filter units share a further problem in that they may not be suitable for use with a relatively short necked spout, such as commonly used in bathrooms, due to interference between the edge of the sink and the filter unit.

In view of these and other deficiencies of the prior art, it is a general objective of the present invention to provide an improved spout-mounted water filter which provides additional vertical clearance between the base of the sink and the outlet of the filter unit.

A further object of the present invention is to provide an improved spout-mounted water filter assembly which is displaced away from the inner sink edge along a longitudinal axis of the spout in order to provide clearance between the edge of the sink and the filter unit.

Another object of the present invention is to provide an extension for use in adapting conventional spout mounted water filter units for use with shallow sinks and/or short necked spouts.

These and other objects of the invention are discussed or will be apparent from the following detailed description of the invention.

SUMMARY OF THE INVENTION

The above-listed objects are met or exceeded by the water filter assembly of the present invention. A feature of the present water filter assembly invention is that additional clearance is provided between the outlet of the filter unit and the base of the sink relative to conventional spout mounted water filters, enabling the present filter assembly to be used with shallow sinks. Further, the water filter assembly of the present invention is configured to provide clearance along the longitudinal axis of the spout for enabling the filter unit to be mounted on a short necked spout without impinging on an edge of the sink. Another feature of the present invention is that it is easy to install and use, and may be retained in a variety of positions relative to the faucet spout.

More specifically, the present water filter assembly is intended for connection to a spout of a water faucet and includes an extension pipe having a spout end and a filter end, a filter unit having a water inlet and a water outlet, a first connection assembly on the filter end for connecting the filter end to the water inlet of the filter unit, and a second connection assembly on the spout end for connecting the spout end to the spout such that the water outlet(s) of the filter unit is disposed above the outlet of the spout. This configuration is an improvement over prior art water filters in that it provides additional vertical and horizontal clearance relative to the base of a sink, allowing a taller glass or container to receive the filtered/unfiltered water. The present water filter assembly is particularly suited for use in conjunction with a shallow sink having a short necked spout such as commonly used in bathrooms.

According to another aspect of the preferred embodiment, the filter assembly of the present invention may be mounted on a radius of a vertical axis of the dispensing end of the spout. This feature provides the user with flexibility in installing and using the present invention in conjunction with sinks and faucets of various shapes and sizes.

According to yet another aspect of the preferred embodiment, the filter unit may be mounted on a radius of a vertical axis of the filter end. This feature of the present invention provides even greater adaptability in using the present invention.

BRIEF DESCRIPTION OF THE DRAWINGS

A preferred embodiment of the present invention is described with reference to the drawings where:

FIG. 6 is a fragmentary vertical sectional view of the spout end of the extension pipe of the present invention; and FIG. 7 is an exploded sectional view of FIG. 6 including a fragmentary side view of the spout.

DESCRIPTION OF THE PREFERRED EMBODIMENT

Figure 1:
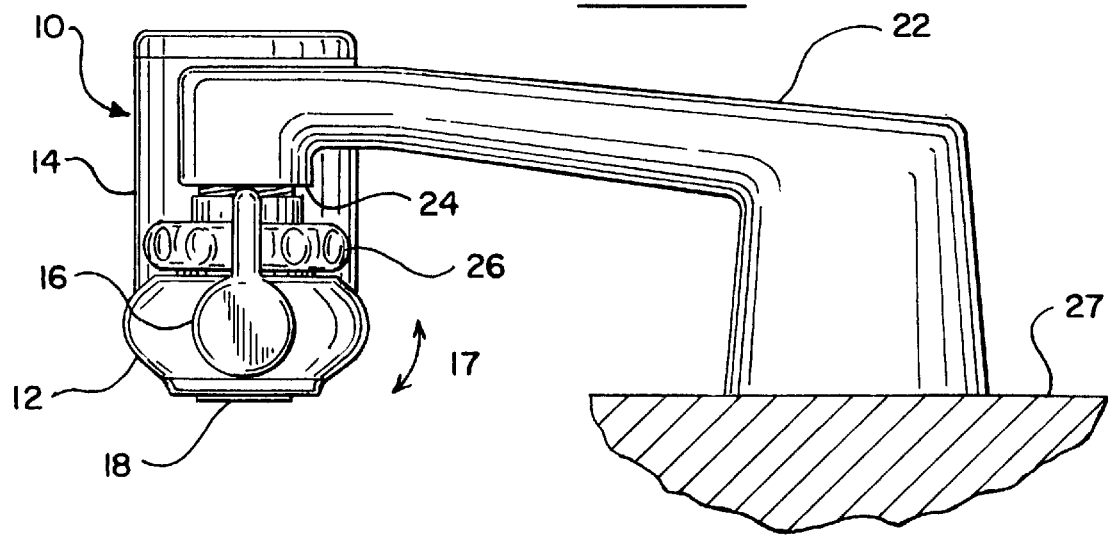
FIG. 1 is a side elevational view of a conventional spout mounted filter unit mounted on a spout.

A conventional faucet spout-mounted water filter unit is depicted in FIG. 1 and is designated generally by the reference number 10. The water filter unit 10 includes a main body 12, a filter cartridge 14, a diverter knob 16, and an outlet 18. The water filter unit 10 can be operated in either of a filter mode or a by-pass mode by turning the diverter knob 16 as shown by curved arrow 17. In the filter mode, the water filter unit 10 dispenses filtered water through the first outlet 18 in the base of the filter cartridge 14. Alternatively, in the bypass mode, unfiltered water is dispensed through a second outlet 20 which is generally disposed in the same horizontal plane as the first outlet 18, below the level of a dispensing end 24 of a spout 22.

As depicted in FIG. 1, a connection assembly, generally designated as 26 is used to attach the water filter unit 10 to the spout 22. The connection assembly 26 includes a gasket, an adapter, and a collar 56 (not shown).

The filter cartridge 14 is filled with a conventional activated carbon filter element or media as is commonly known by those of ordinary skill in the art. Representative filter media includes formulations of carbon block, and/or granulated carbon for removing impurities such as lead, heavy metals, chlorine or the like, eliminating odors and enhancing the overall quality and flavor of the water. In the preferred embodiment, depicted in FIG. 2, the filter cartridge 14 contains both hollow filter fibers and granulated activated carbon (not shown) thus providing two stage filtering of the water. Upon its exhaustion, the filter cartridge 14 may be replaced independently of the rest of the water filter unit 10 by rotating the cartridge about its vertical axis to disengage the cartridge from the unit.

Figure 2:
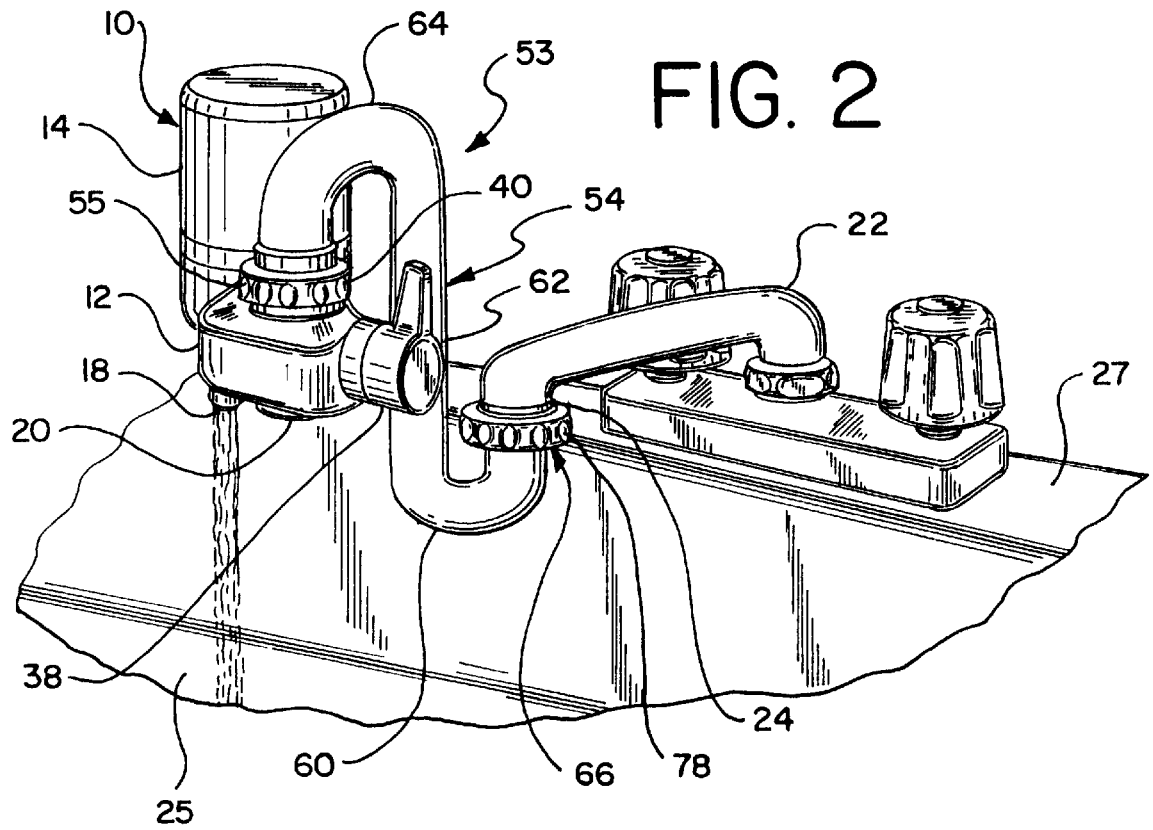
FIG. 2 is a top perspective view of the water filter assembly of the present invention.

Referring now to FIG. 2, the water filter assembly of the present invention is designated generally by the reference number 30 and includes the water filter unit 10 and an extension pipe 32. The extension pipe 32 is generally S-shaped and has a spout end 34, a filter end 36, a lower U-shaped portion 38, a generally vertical leg 40, and an upper inverted U-shaped portion 42. The respective radii of curvature of each U-shaped portion 38 and 42 are preferably constant, but are not necessarily equal. Specifically, in the preferred embodiment the radius of curvature of the upper inverted U-shaped portion 42 is larger than the radius of curvature of the lower U-shaped portion 38.

In the embodiment depicted in FIGS. 2–7, the extension pipe 32 is formed of plastic; however, one of ordinary skill in the art will appreciate that it may be formed of metal, engineered material or other non-toxic self-supporting materials.

Importantly, the extension pipe 32 is configured such that the first and the second dispensing outlets, 18 and 20 are positioned above a horizontal plane passing through the dispensing end 24 of the spout 22 in order to provide additional clearance relative to a base 44 of a sink 46 for receiving a glass, a cup or other type of drinking container. While other shapes of the extension pipe 32 are contemplated and fall within the scope of the present invention, the embodiment depicted in FIG. 2 is preferred.

Figure 3:
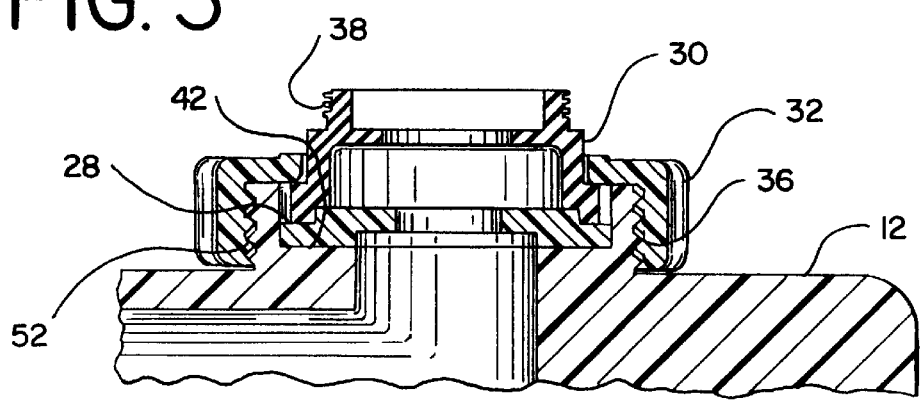
FIG. 3 is a fragmentary vertical sectional view of the body portion of the water filter assembly of the present invention.
Figure 4:
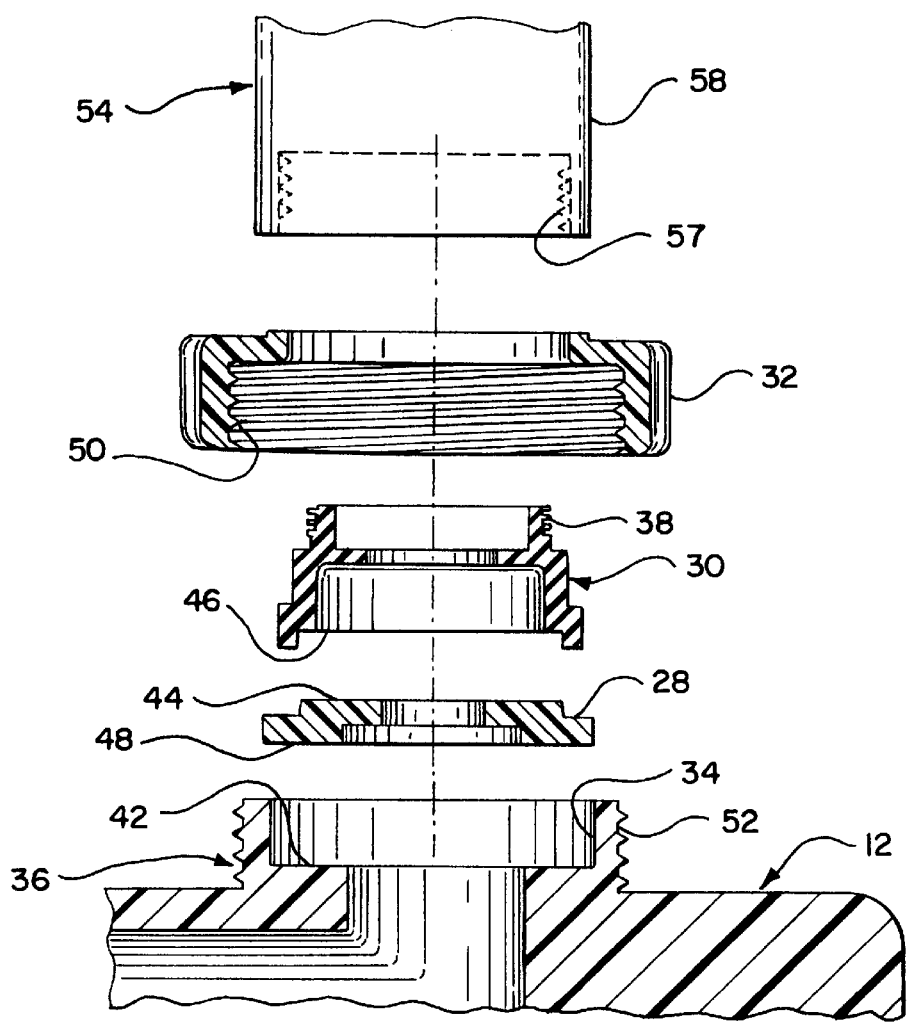
FIG. 4 is an exploded sectional view of FIG. 3 including a fragmentary side view of the extension pipe of the present invention.

Referring now to FIGS. 3 and 4, a first connection assembly, generally designated as 50, is used to attach the water filter unit 10 to the filter end 36 of the extension pipe 32. Similar in configuration and construction to the connection assembly 26 (FIG. 1), the first connection assembly 50 includes a generally flat gasket 52, an adapter 54, and a collar 56. The adapter 54 is configured to fit within a seat 58 (best seen in FIG. 4) formed within a neck 60 of the main body 12 and is provided with external threads 62 for threadably engaging corresponding threads 64 in the filter end 36 of the extension pipe 32. A plurality of knurls 66 are provided on an exterior surface of the adapter 54 to assist in threading the adapter 54 into the filter end 36. The gasket 52 is interposed between a base 68 of the seat 58 and the adapter 54 and has a neck 70 which is configured to fit within a recess 72 formed in the bottom of the adapter. A base 74 of the gasket 52 is configured to fit within the seat 58. In addition, the adapter 54 is releasably held within the seat 58 by the collar 56, an inner lip 75 of which engages a shoulder 76 of the adapter. The collar 56 is provided with threads 77 configured to mesh with corresponding threads 78 on the neck 60. A plurality of knurls 79 are provided on an exterior surface of the collar 56 to facilitate threading the collar 56 onto the neck 60.

While other methods of connecting the water filter unit 10 to the extension pipe 32 are contemplated, the first connection assembly 50 depicted in FIGS. 2–4 is the preferred embodiment. One of ordinary skill in the art would recognize that there are many acceptable ways of accomplishing this connection.

Referring now to FIGS. 6 and 7, a description of how the extension pipe 32 attaches to the dispensing end 24 of the spout 22 is provided. A second connection assembly, generally designated by reference number 80 in FIG. 7 is used to attach the spout end 34 of the extension pipe 32 to the dispensing end 24 of the spout 22. The second connection assembly 80 is similar to the first connection assembly 50, and includes a generally flat gasket 82, an adapter 84, and a collar 86. Configured to fit within a seat 88 formed within the spout end 34, the adapter 84 is provided with threads 90 for threadably engaging corresponding threads 92 on the dispensing end 24 of the spout 22. The adapter 84 is further provided with knurls 93 on an exterior surface to facilitate threading the adapter 84 into the dispensing end 24 of the spout 22. Interposed between a base 94 of the seat 88 and the adapter 84, the gasket 82 has a neck 96 which is configured to fit within a recess 98 formed in the bottom of the adapter 84, and has a base 100 which is configured to fit within the seat 88. The adapter 84 is releasably held within the seat 88 by the collar 86, an inner lip 101 of which engages a shoulder 102 of the adapter. Threads 103 are provided on the interior of the collar 86 to mesh with corresponding external threads 104 on the spout end 34 of the extension pipe 32. As is the case with the connection assembly 50, the collar 86 and the adapter 84 are tightly threaded by hand to the corresponding receptacles to prevent leaks. To facilitate threading the collar 86 onto the extension pipe 32, a plurality of knurls 105 are provided on an exterior surface of the collar 86.

Figure 5A:
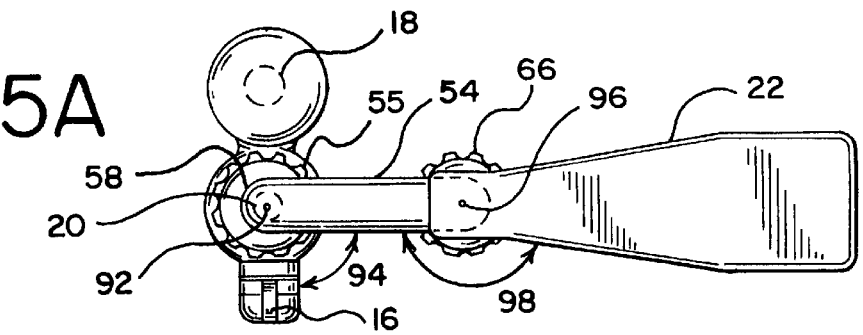
FIGS. 5A–5E are overhead plan views of the water filter assembly of the present invention.

Referring now to FIGS. 5A–5E, an explanation is provided of the feature of the present invention where the water filter unit 10 may be mounted on a radius of a vertical axis of the filter end 36 (first adjustment feature), as well as the feature where the water filter assembly 30 may be mounted on a radius of a vertical axis of the dispensing end of the spout 22 (second adjustment feature). As shown in FIG. 5A, the water filter unit 10 may be mounted on a radius 108 of a vertical axis 106 of the filter end 36. As will be appreciated by one of ordinary skill in the art, the water filter unit 10 is maintained in a fixed position relative to the extension pipe by the tight engagement between the collar 56 and the unit 10. Thus, collar 56 must be loosened in order to allow re-positioning of the water filter unit 10 relative to the extension pipe 32.

Figure 5B:
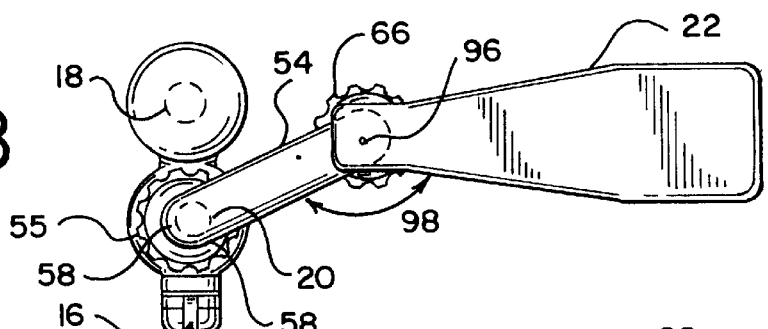

As shown in FIG. 5B, water filter assembly 30 may be mounted on a radius 112 of a vertical axis 110 of the dispensing end 24 of the spout 22. As will be appreciated by one of ordinary skill in the art, the water filter assembly 30 is maintained in a fixed position relative to the spout 22 by the tight engagement of the collar 86 and the extension pipe 32. Thus, collar 86 must be loosened in order to facilitate positioning of the water filter assembly 30 relative to the spout 22.

Figure 5C:
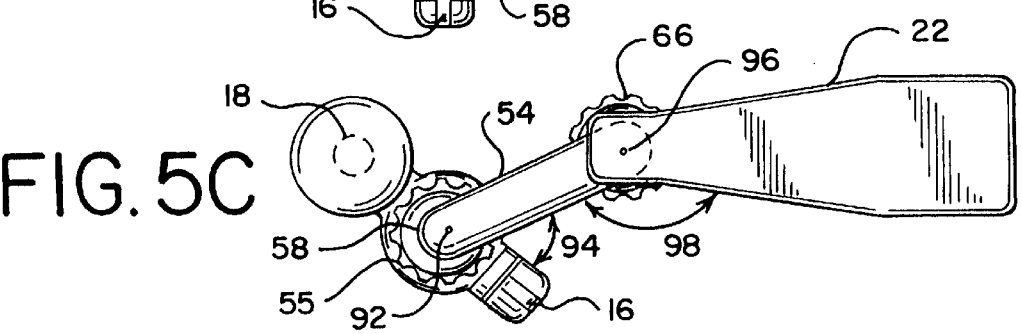
Figure 5D:
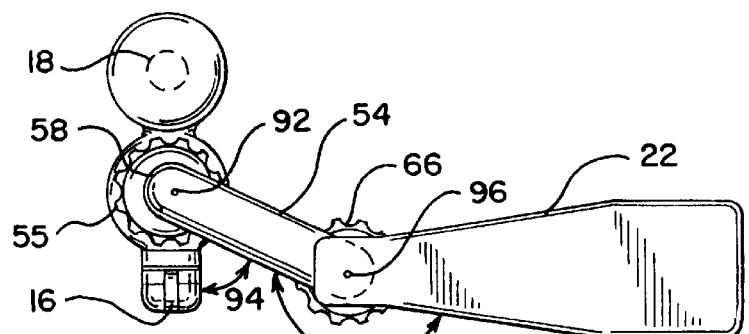
Figure 5E:
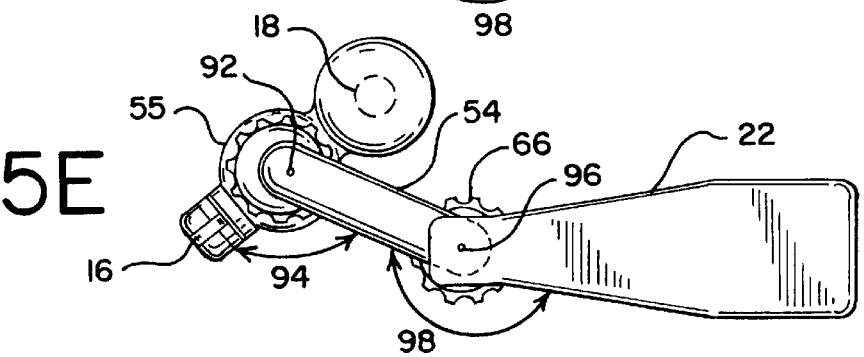

FIG. 5C depicts an embodiment where the unit 10 and the extension pipe 32 are angularly displaced from the axial alignment shown in FIG. 5A. In this manner, the unit 10 may be laterally displaced relative to the spout 22. FIG. 5D shows a reverse complimentary displacement of the extension pipe 32 relative to the spout 22 and the unit 10, and FIG. 5E depicts a different angular orientation of both the unit 10 and the extension pipe 32 relative to each other and to the spout 22.

The above described first and second adjustment features of the present invention enable the water filter assembly to be adapted to conform to the size and shape of a variety of sink/spout configurations. Further, these features greatly enhance installation of the present invention in, for example, a relatively cramped bathroom sink.

While a particular embodiment of the present spout mounted water filter assembly and extension has been shown and described, it will be appreciated by those skilled in the art that changes and modifications may be made thereto without departing from the invention in its broader aspects and as set forth in the following claims.

What is claimed is:

1. A faucet mounted water filter assembly for connection to a dispensing end of a water spout, said filter assembly being supportably mounted to the spout of the faucet and providing additional clearance between a base of a sink and a dispensing portion of said assembly, said assembly comprising:

an extension pipe having a spout end and a filter end;

water filter means for filtering water, said water filter means having a water inlet and a water outlet;

first connecting means for supportably connecting said water inlet to said filter end so that said water outlet is disposed above a horizontal plane passing through the dispensing end of the spout thereby providing additional clearance relative to the base of the sink; and second connecting means for supportably connecting said spout end to the dispensing end of the spout.

2. The water filter assembly according to claim 1, wherein said second connecting means adjustably engages said spout end in one of a plurality of positions on a radius of a vertical axis of the dispensing end of the spout.

3. The water filter assembly according to claim 1, wherein said first connecting means adjustably engages said water filter means in one of a plurality of positions on a radius of a vertical axis of said filter end.

4. The water filter assembly according to claim 1, wherein said water outlet is displaced from the dispensing end along a longitudinal direction of the spout.

5. The water filter assembly according to claim 1, wherein said first connecting means includes a threaded adapter for engaging with mating threads on said filter end, a gasket, and a threaded collar for engaging with corresponding threads on a neck of said water filter means.

6. The water filter assembly according to claim 1, wherein said second connecting means includes a threaded adapter for engaging with mating threads on the dispensing end of the spout, a gasket, and a threaded collar for engaging with corresponding threads on said spout end.

7. The water filter assembly according to claim 1, wherein said extension pipe is generally S-shaped.

8. The water filter assembly according to claim 7, wherein said S-shaped extension pipe has a first lower U-shaped portion proximate said spout end, a generally vertical leg, and an upper inverted U-shaped portion proximate said water filter means.

9. A water filter extension device for use with a faucet spout-mounted water filter unit disposed above a sink, the extension device supporting the filter unit and providing at least one of additional vertical and horizontal clearance between an outlet of the filter unit and a base of a sink relative to a dispensing end of a spout, said extension device comprising:

a rigid extension pipe having a spout end and a filter end;

a first connecting means for supportably connecting said spout end to the spout;

a second connecting means for supportably connecting said filter unit to said filter end so that the outlet of the filter unit is rigidly disposed above the spout relative to the sink.

10. The water filter extension device according to claim 9, wherein said second connecting means adjustably engages said extension pipe in one of a plurality of positions on a radius of a vertical axis of the dispensing end of the spout.

11. The water filter extension device according to claim 9, wherein the outlet of the filter unit is displaced from the dispensing end along a longitudinal direction of the spout.

12. The water filter extension device according to claim 9, wherein said second connecting means includes a threaded adapter for engaging with mating threads on the dispensing end of the spout, a gasket, and a threaded collar for engaging with corresponding threads on said spout end of said extension pipe.

13. The water filter extension device according to claim 9, wherein said first connecting means includes a threaded adapter for engaging with mating threads on said filter end of said extension pipe, a gasket, and a threaded collar for engaging with corresponding threads on the water filter unit.

14. The water filter extension device according to claim 9, wherein said extension pipe is generally S-shaped.

15. The water filter extension device according to claim 14, wherein said S-shaped extension pipe has a first lower U-shaped relative proximate said spout end and an upper inverted U-shaped portion proximate said filter end.

* * * * *